(12) United States Patent
Kurth et al.

(10) Patent No.: US 9,867,133 B2
(45) Date of Patent: Jan. 9, 2018

(54) COMMUNICATION DEVICE AND METHOD FOR PERFORMING RADIO COMMUNICATION

(71) Applicant: Intel IP Corporation, Santa Clara, CA (US)

(72) Inventors: Mathias Kurth, Dresden (DE); Matthias Hofmann, Freital (DE); Andreas Bury, Dresden (DE)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 15/356,787

(22) Filed: Nov. 21, 2016

(65) Prior Publication Data

US 2017/0181096 A1    Jun. 22, 2017

(30) Foreign Application Priority Data

Dec. 21, 2015  (DE) .......................... 10 2015 122 431

(51) Int. Cl.
| | |
|---|---|
| *H04B 1/16* | (2006.01) |
| *H04W 52/02* | (2009.01) |
| *H04W 76/04* | (2009.01) |
| *H04W 88/02* | (2009.01) |

(52) U.S. Cl.
CPC ..... *H04W 52/0258* (2013.01); *H04W 76/048* (2013.01); *H04W 88/02* (2013.01)

(58) Field of Classification Search
CPC . H04L 25/00; H04L 27/2613; H04L 27/2656; H04L 1/0069; H04L 27/34; H04L 27/3809; H04W 76/048
USPC ............................................ 455/127.2, 115.3
See application file for complete search history.

(56) References Cited

U.S. PATENT DOCUMENTS

| | | | |
|---|---|---|---|
| 2004/0203460 A1 | 10/2004 | Hasegawa | |
| 2013/0176873 A1* | 7/2013 | Ji ...................... | H04W 52/0283 370/252 |
| 2016/0014695 A1* | 1/2016 | Ehsan ...................... | H04L 5/14 370/311 |

OTHER PUBLICATIONS

German Office Action based on Application No. 10 2015 122 431.3 (10 Pages) dated Oct. 27, 2016 (Reference Purpose Only).

* cited by examiner

*Primary Examiner* — Tu X Nguyen
(74) *Attorney, Agent, or Firm* — Viering,Jentschura& PartnermbB

(57) ABSTRACT

A communication device is provided comprising a radio frequency circuit configured to receive a first radio frequency signal and a second radio frequency signal. A baseband circuit configured to determine a gain level based on the first radio frequency signal. A clock circuit configured to generate a clock signal. The radio frequency circuit is configured to determine a gain adjusted signal based on the second radio frequency signal and on the gain level. The baseband circuit is configured to synchronize the clock signal based on the gain adjusted signal.

23 Claims, 6 Drawing Sheets

COMMUNICATION DEVICE AND METHOD FOR PERFORMING RADIO COMMUNICATION

RELATED APPLICATIONS

This application claims priority of German patent application No. 10 2015 122 431.3, filed on Dec. 21, 2015, the entire contents of which are hereby incorporated herein by reference.

TECHNICAL FIELD

The present disclosure relates to communication devices and methods for performing radio communication.

BACKGROUND

In a scenario, a wireless communication device may have a receiver and may power-up the receiver and power-down the receiver in accordance with a discontinuous reception in order to save energy. The communication device may adjust a gain and, after adjusting the gain, may synchronize a clock signal of the communication device based on the received signal. It may be desirable to provide a communication device with an efficient and short clock signal synchronization procedure.

SUMMARY

A communication device is provided comprising a radio frequency circuit configured to receive a first radio frequency signal and a second radio frequency signal. A baseband circuit configured to determine a gain level based on the first radio frequency signal. A clock circuit configured to generate a clock signal. The radio frequency circuit is configured to determine a gain adjusted signal based on the second radio frequency signal and on the gain level. The baseband circuit is configured to synchronize the clock signal based on the gain adjusted signal.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
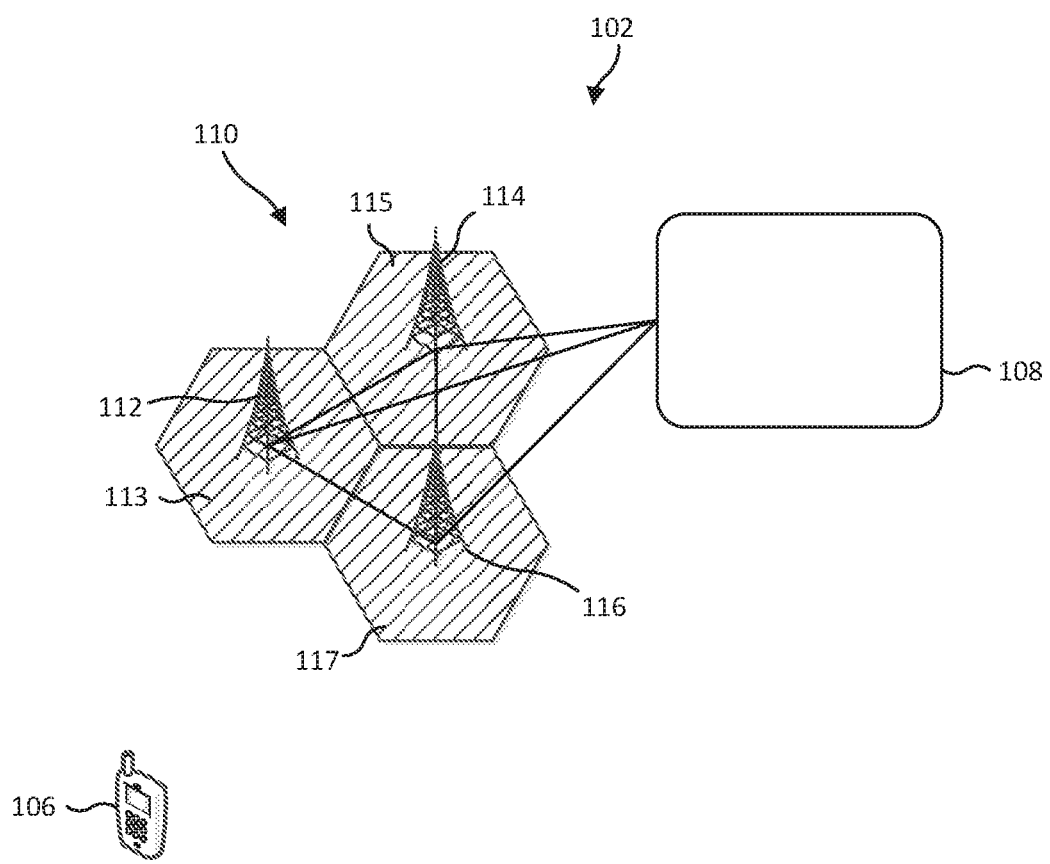
FIG. 1 shows a schematic drawing of a mobile radio communication network and a mobile wireless device according to an example.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

Various aspects of this disclosure provide a communication device that includes a radio frequency circuit configured to receive a first radio frequency signal and a second radio frequency signal. Further, the communication device may include a baseband circuit configured to determine a gain level based on the first radio frequency signal. Moreover, the communication device may include a clock circuit configured to generate a clock signal. The radio frequency circuit may be configured to determine a gain adjusted signal based on the second radio frequency signal and on the gain level. The baseband circuit may be configured to synchronize the clock signal based on the gain adjusted signal. Thus, the communication device may be efficient and have a low energy consumption.

In an example, the radio frequency circuit may be configured to power-down and to power-up in accordance with a discontinuous reception cycle. Further, the radio frequency circuit may be configured to receive the first radio frequency signal in a first power-up phase of the discontinuous reception cycle and the second radio frequency signal in a second power-up phase of the discontinuous reception cycle that may be different from the first power-up phase of the discontinuous reception cycle. Thus, the communication device may be effective.

In an example, the radio frequency circuit may be configured to determine the gain adjusted signal by amplifying the second radio frequency signal with an amplification factor based on the gain level.

In an example, the radio frequency circuit may include a receiver and a gain control circuit. The receiver may be configured to receive the first radio frequency signal and the second radio frequency signal. Further, the gain control circuit may be configured to determine the gain adjusted signal based on the second radio frequency signal and on the determined gain level.

In an example, the gain control circuit may be configured to determine the gain adjusted signal by adjusting at least one of a an amplitude of the second radio frequency signal or a power of the second radio frequency signal. The adjustment of the amplitude may be at least one of an increase or decrease of the amplitude. The adjustment of the power may be at least one of an increase or decrease of the power.

In an example, the radio frequency circuit may include an antenna configured to receive the first radio frequency signal and the second radio frequency signal.

Various aspects of this disclosure provide a communication device that may, include a receiver configured to receive a first radio frequency signal and a second radio frequency signal that may be different from the first radio frequency signal. Further, the communication device may include a clock circuit configured to generate a clock signal. Moreover, the communication device may include a baseband circuit configured to determine a gain level based on the first radio frequency signal and to synchronize the clock signal based on the second radio frequency signal and the determined gain level. Further, the communication device may include a gain control circuit configured to determine a gain adjusted signal based on the second radio frequency signal and on the determined gain level. Thus, the communication device may be efficient.

In an example, the gain control circuit may be configured to determine the gain adjusted signal by amplifying the second radio frequency signal with an amplification factor based on the gain level. Thus, the communication device may be able to start to synchronize the clock signal at the beginning of the second radio frequency signal. The second radio frequency signal may be a subframe based on a radio communication technology. Further, the communication device may be able to execute gain tracking and the synchronization of clock signal based on the same subframe. Moreover, the communication device may be energy efficient.

In an example, the receiver may be configured to power-down and to power-up in accordance with a discontinuous reception cycle. Further, the radio frequency circuit may be configured to receive the first radio frequency signal in a first power-up phase of the discontinuous reception cycle. Moreover, the receiver may be configured to receive the second radio frequency signal in a second power-up phase of the discontinuous reception cycle that may be different from the first power-up phase of the discontinuous reception cycle. Thus, the communication device may be effective.

In an example, the baseband circuit may be configured to determine a gain target level that may be lower than the gain level. Further, the gain control circuit may be an automatic gain control circuit configured to amplify the second radio frequency signal in accordance with the gain level as an initial gain level and a gain target level. Thus, the communication device may be effectively and reliably be configured to synchronize the clock signal.

In an example, the gain target level may be an amplitude range. Further, the gain control circuit may be configured to determine the gain adjusted signal such that the amplitude of the second radio frequency signal may be within the amplitude range. Thus, the gain control circuit may be able to keep the gain level constant. Further, the communication device may be effective and efficient.

In an example, the baseband circuit may be configured to determine the gain level to be a gain level of the first radio frequency signal. Thus, the communication device may be effective and efficient. The gain level may be a gain level of at least one of an amplitude or a power of the first radio frequency signal.

In an example, the baseband circuit may be configured to determine the gain adjusted signal such that the gain level of the amplitude of the second radio frequency signal may be constant during the synchronization of the clock signal. Thus, the communication device may be reliable.

In an example, the receiver may include an antenna configured to receive the first radio frequency signal and the second radio frequency signal.

In an example, the second power-up phase of the discontinuous reception cycle may be different from the first power-up phase of the discontinuous reception cycle.

Furthermore, a method for performing radio communication may be provided that may include receiving a first radio frequency signal and a second radio frequency signal. Further, the method may include determining a gain level based on the first radio frequency signal. Moreover, the method may include generating a clock signal. Further, the method may include determining a gain adjusted signal based on the second radio frequency signal and on the gain level. Moreover, the method may include synchronizing the clock signal based on the gain adjusted signal.

Furthermore, a method for performing radio communication may be provided that may include receiving a first radio frequency signal and a second radio frequency signal that may be different from the first radio frequency signal. Further, the method may include generating a clock signal. Moreover, the method may include determining a gain level based on the first radio frequency signal. Further, the method may include synchronizing the clock signal based on the second radio frequency signal and the determined gain level. Moreover, the method may include determining a gain adjusted signal based on the second radio frequency signal and on the determined gain level.

It should be noted that aspects described in the context of the previous examples may be analogously valid for the above provided methods.

FIG. 1 shows a schematic drawing of a mobile radio communication network 102 and a mobile wireless device 104 according to an example. The mobile radio communication network 102 may have a first core network 108 and a first access network 110. The first access network 110 may include a first base station 112 of a first cell 113, a second base station 114 of a second cell 115 and a third base station 116 of a third cell 117. Further, the mobile wireless device 106 may be configured to receive a first radio frequency signal in a first power-up phase of a discontinuous reception cycle and a second radio frequency signal in a second power up phase of the discontinuous reception cycle.

Figure 2:
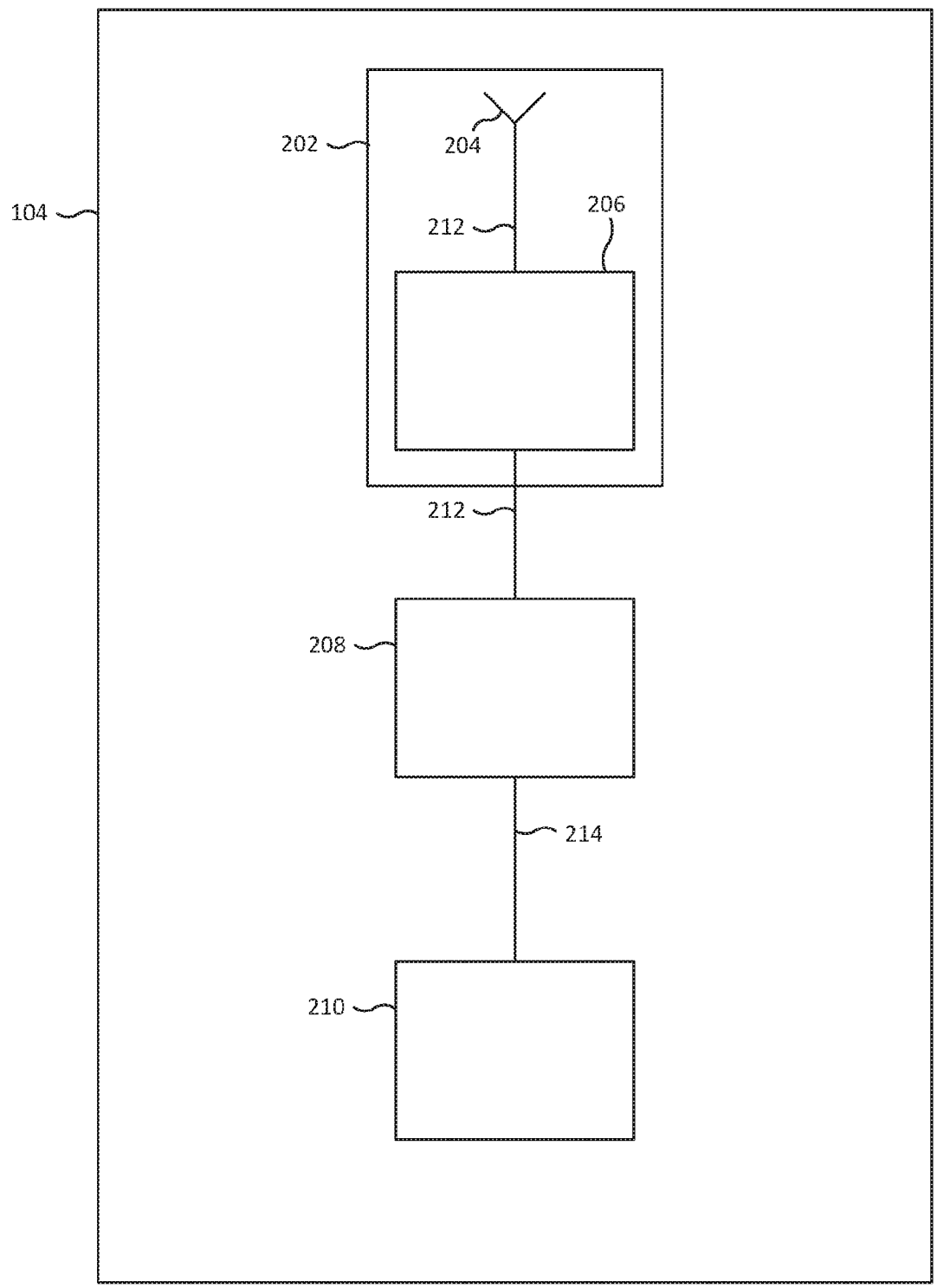
FIG. 2 shows a schematic drawing of the mobile wireless device according to an example.

FIG. 2 shows a schematic drawing of the mobile wireless device 104 according to an example. The mobile wireless device 104 include a radio frequency circuit 202 that includes an antenna 204 and a gain control circuit 206, a baseband circuit 208 and a clock circuit 210. The radio frequency circuit 200 to may be connected with the baseband circuit 208 via a first connection 212. The baseband circuit 208 may be connected with the clock circuit 210 via a second connection 214.

Further, the antenna 204 of the radio frequency circuit 202 may be configured to receive the first radio frequency signal and the second radio frequency signal and transmit the received signal to the gain control circuit 206. The gain control circuit 206 may be configured to amplify the received signals in accordance with amplification factors, respectively. The amplification factors may be gains of at least one of a power of the respective received signal or an amplitude of the respective received signal.

Moreover, after a power-down phase of the discontinuous reception cycle in which antenna 204 may not be configured to receive radio frequency signals and the gain control circuit 206 may be powered down, the baseband circuit may be configured to determine a gain level based on the first radio frequency signal. The gain level may include an initial gain and a gain target level. The initial gain may be the gain level of the amplitude of the first radio frequency signal.

Further, the gain control circuit 206 may be configured as automatic gain control circuit such that starting from the initial gain the gain control circuit 206 may be configured to amplify the received radio frequency signal in accordance with the gain target level. The gain target level may be a gain target range. Moreover, the gain control circuit 206 may be configured to amplify the received radio frequency signal such that a signal to noise ratio of the radio frequency signal is in the gain target range. As an alternative, the gain control circuit 206 may be configured to amplify the received radio frequency signal such that the amplification factor is in the gain target range.

Moreover, the clock circuit 210 may be configured to generate a clock signal and to transmit the clock signal to the baseband circuit 208. The baseband circuit 208 may be configured to determine if the amplitude of the amplified second radio frequency signal is in a suitable range for a clock signal synchronization. In an example, a suitable gain target range may be between 45 dB and 62 dB. Further, if the amplitude of the amplified second radio frequency signal is in a suitable range for the clock signal synchronization, the baseband circuit 208 may be configured to synchronize the clock signal of the clock circuit 210 in the second power up phase of the discontinuous reception cycle based on the amplified first radio frequency signal that may be a gain adjusted signal. Moreover, the baseband circuit 208 may be configured to keep gain target level constant during the synchronization of the clock signal.

If the amplitude of the amplified second radio frequency signal is not in a suitable range for the clock signal synchronization the baseband circuit 208 may be configured to start a gain tracking procedure. The gain tracking procedure may include determining a gain to amplify an amplitude of the second radio frequency signal such that the amplified second radio frequency signal may be suitable for the clock signal synchronization.

Figure 3:
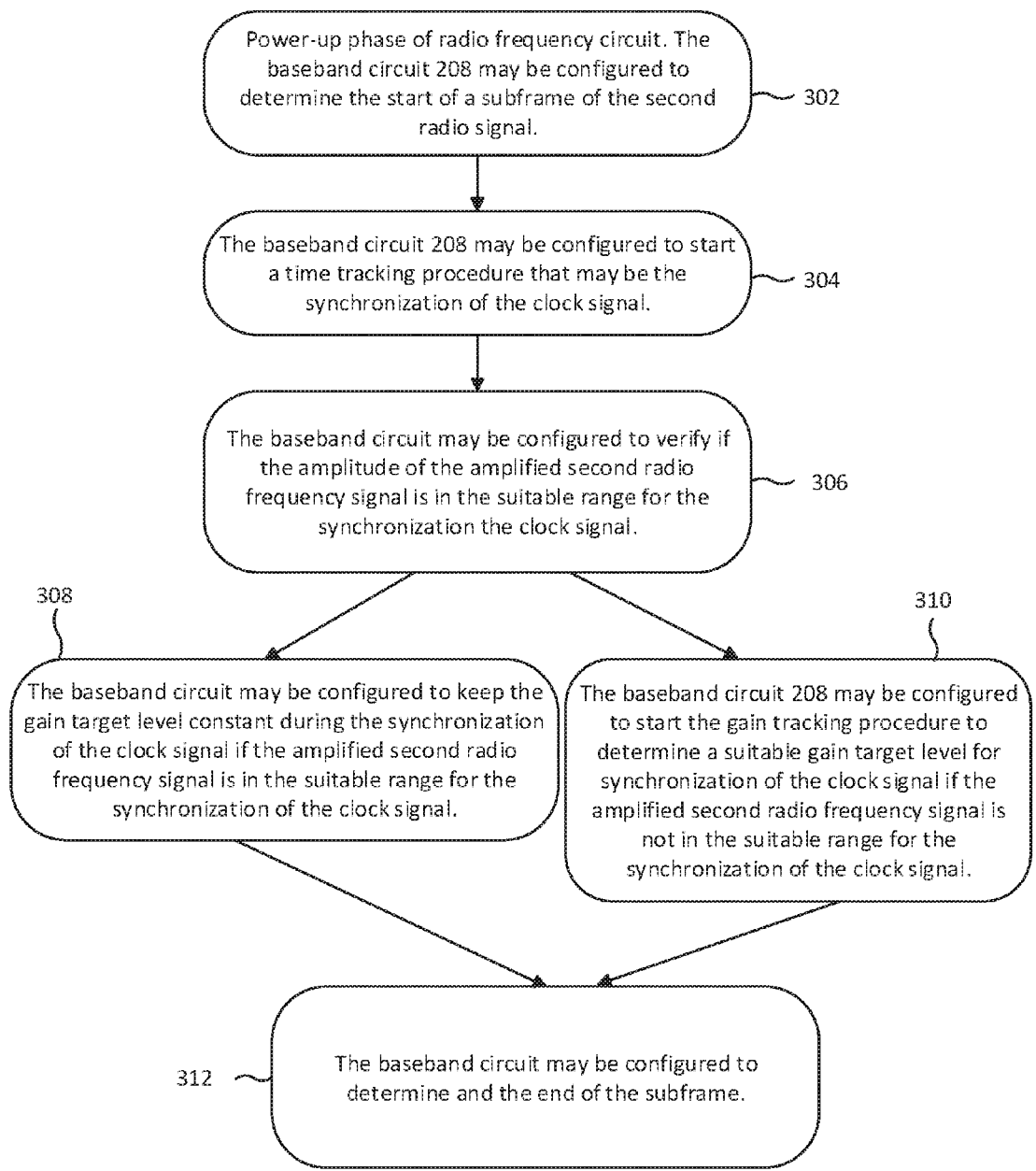
FIG. 3 shows a flow diagram of clock signal synchronization based on the amplified second radio frequency signal.

FIG. 3 shows a flow diagram of clock signal synchronization based on the amplified second radio frequency signal. In 302, the radio frequency circuit 202 may be configured to be in a power-up phase of the discontinuous reception cycle. Further, the baseband circuit 208 may be configured to determine the start of a subframe of the second radio signal.

In 304, the baseband circuit 208 may be configured to start a time tracking procedure that may be the synchronization of the clock signal.

In 306, the baseband circuit 208 may be configured to verify if the amplitude of the amplified second radio frequency signal is in the suitable range for the synchronization the clock signal. The baseband circuit 208 may be configured to execute the verification in one third of a millisecond.

In 308, the baseband circuit 208 may be configured to keep the gain target level constant during the synchronization of the clock signal if the amplified second radio frequency signal is in the suitable range for the synchronization of the clock signal.

In 310, the baseband circuit 208 may be configured to start the gain tracking procedure to determine a suitable gain target level for synchronization of the clock signal if the amplified second radio frequency signal is not in the suitable range for the synchronization of the clock signal.

In 312, the baseband circuit 208 may be configured to determine and the end of the subframe.

Figure 4:
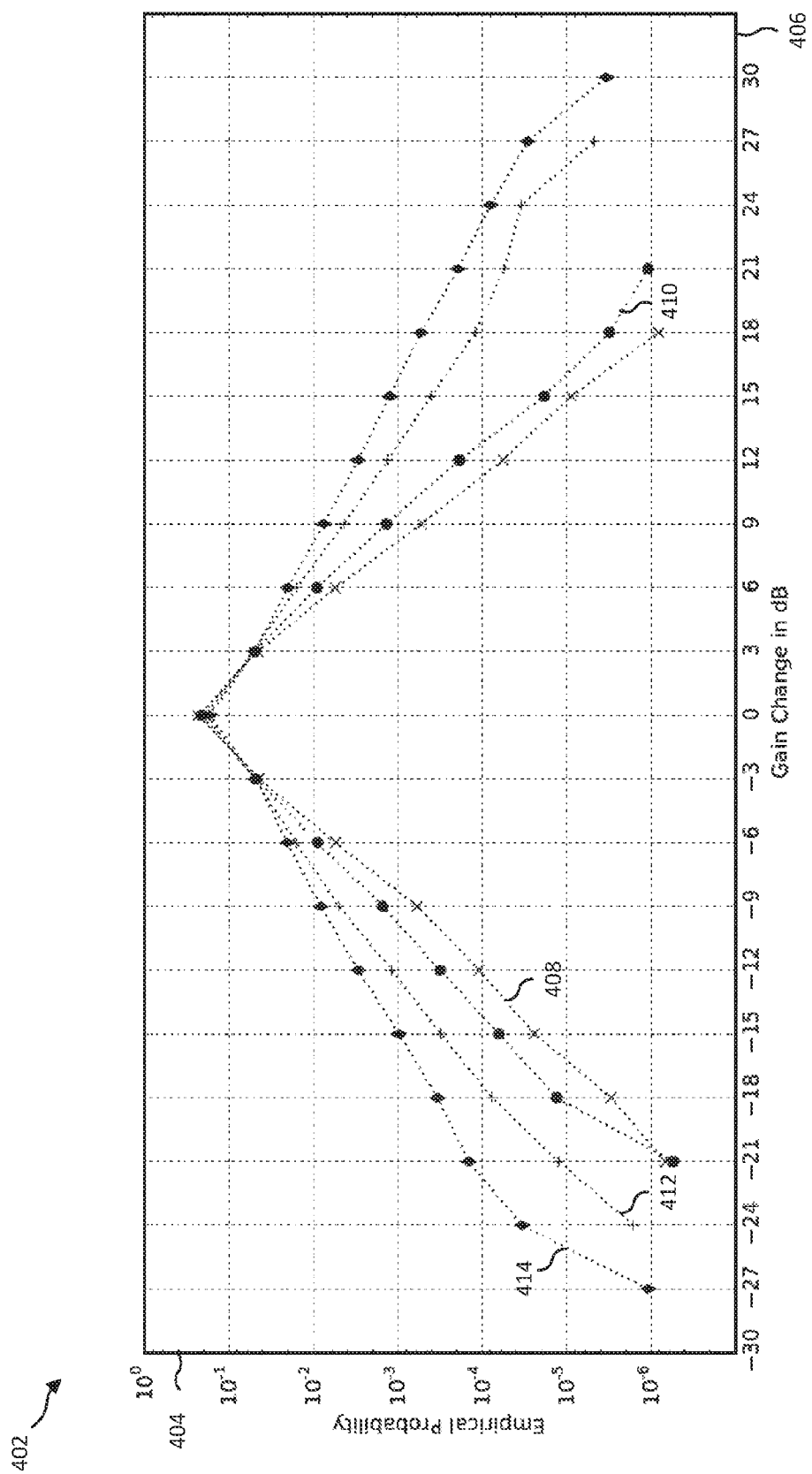
FIG. 4 shows gain variabilities between two power-up phases of the discontinuous reception cycle.

FIG. 4 is a schematic diagram 402 that may show gain variabilities between two power-up phases of the discontinuous reception cycle. The diagram 402 may have a first axis 404 that indicates an empirical probability of a difference in a change of the gain target level that may be associated with a difference of amplitudes of received radio frequency signals. Further, the diagram 402 may have a second axis 406 that may indicate the change of the gain target level.

Moreover, the diagram 402 may have a first curve 408, a second curve 410, a third curve 412 and a fourth curve 414 that may show empirical probabilities of changes of the gain target level associated with time differences of 80 ms, 320 ms, 1280 ms and 2560 ms between two power up phases of the discontinuous reception cycle, respectively. The empirical probabilities associated with large changes of the gain target level of each curve may be smaller than the empirical probabilities associated with small changes of the gain target level, respectively. The changes of the gain target level may be associated with changes of network signals in simulated circumstances of movements of the wireless mobile device, respectively.

Figure 5:
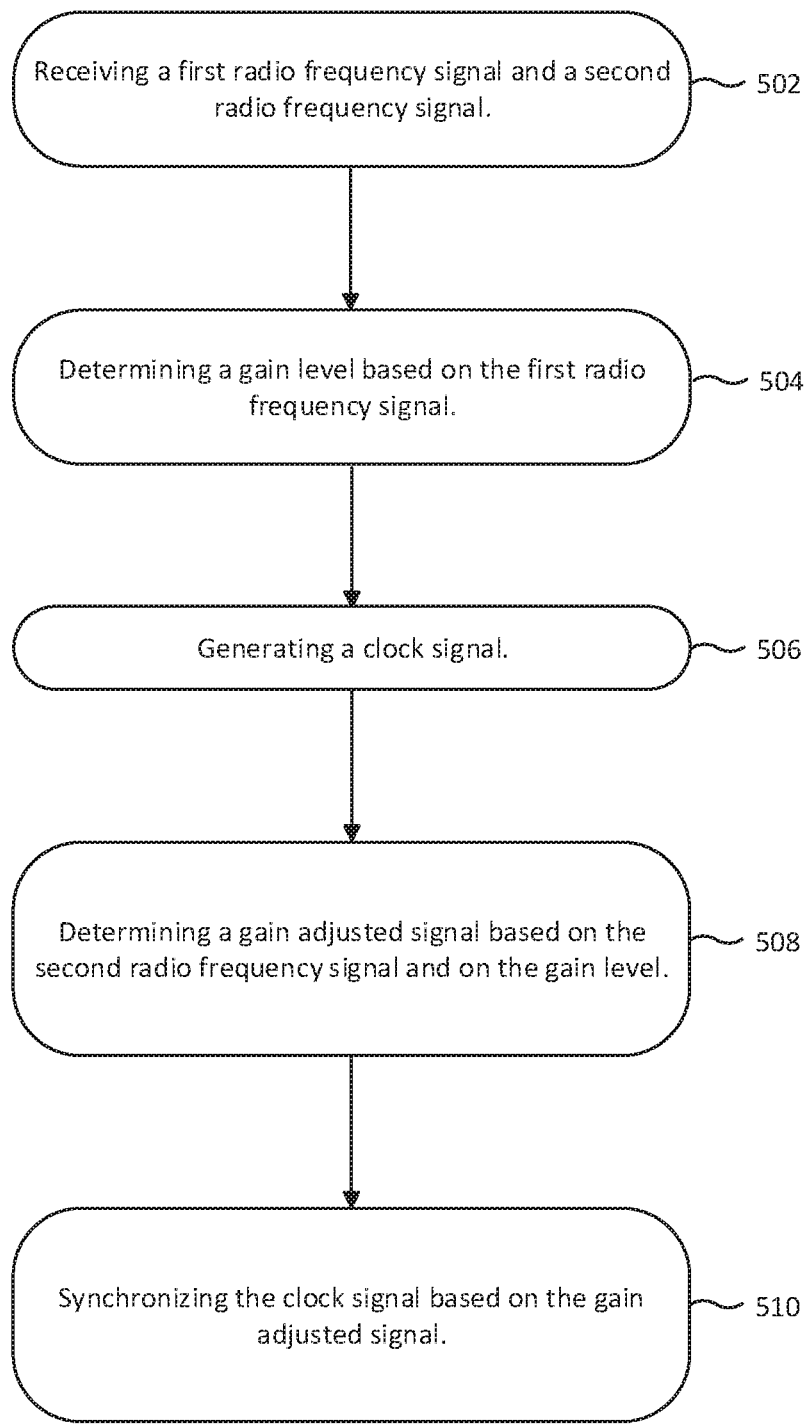
FIG. 5 shows a method for performing radio communication.

FIG. 5 shows a method for performing radio communication that may include, 502, receiving a first radio frequency signal and a second radio frequency signal.

The method may include, in 504, determining a gain level based on the first radio frequency signal.

The method may include, in 506, generating a clock signal.

The method may include, in 508, determining a gain adjusted signal based on the second radio frequency signal and on the gain level.

The method may include, in 510, synchronizing the clock signal based on the gain adjusted signal.

Figure 6:
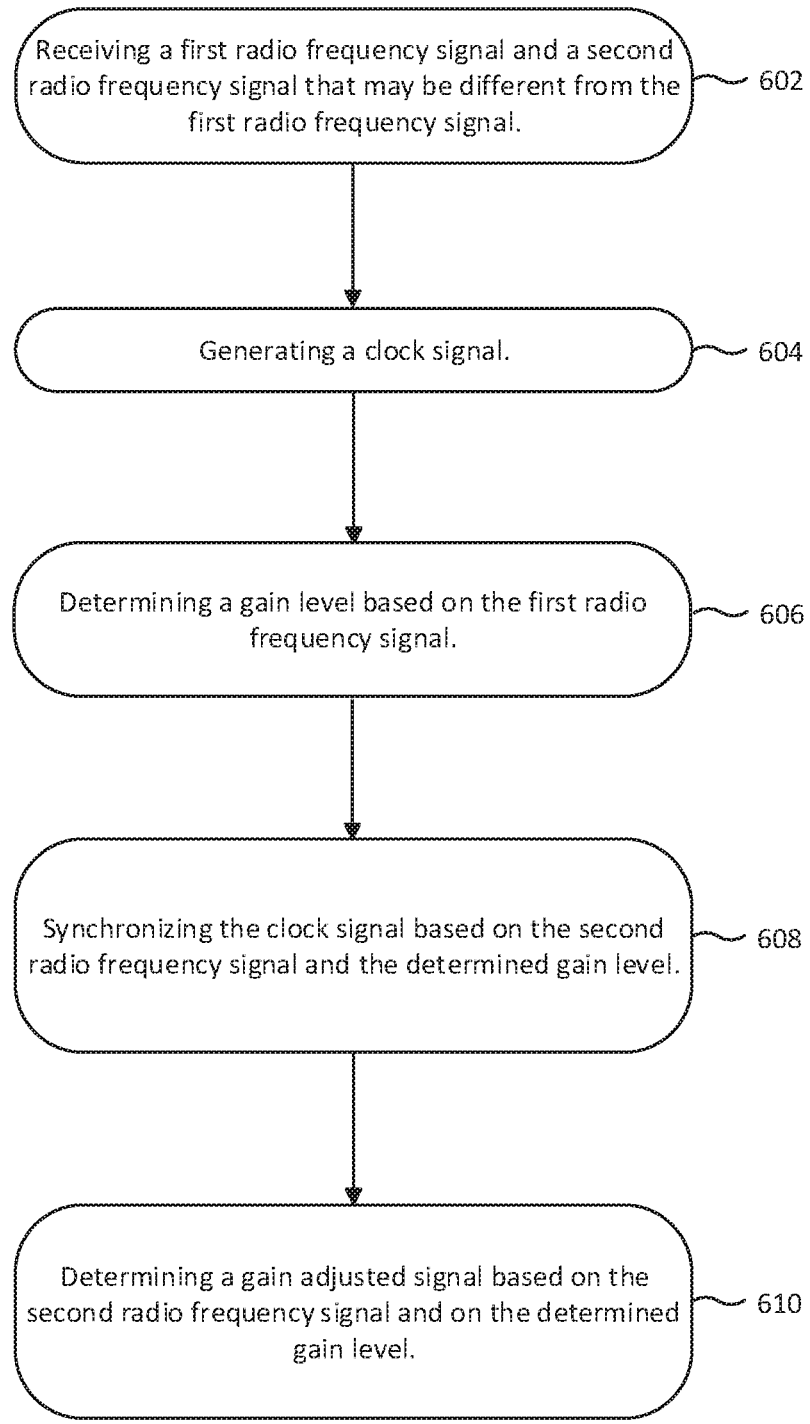
FIG. 6 shows a method for performing radio communication.

FIG. 6 shows a method for performing radio communication that may include, in 602, receiving a first radio frequency signal and a second radio frequency signal that may be different from the first radio frequency signal.

The method may include, in 604, generating a clock signal.

Moreover, the method may include, in 606, determining a gain level based on the first radio frequency signal.

Further, the method may include, in 608, synchronizing the clock signal based on the second radio frequency signal and the determined gain level.

Moreover, the method may include, in 610, determining a gain adjusted signal based on the second radio frequency signal and on the determined gain level.

It should be noted that aspects described in the context of the wireless mobile device according to the examples of FIG. 1 to FIG. 4 are analogously valid for the methods that are illustrated based on FIG. 5 and FIG. 6.

In the following, various aspects of this disclosure will be illustrated:

Example 1 is a communication device that may include a radio frequency circuit configured to receive a first radio frequency signal and a second radio frequency signal, a baseband circuit configured to determine a gain level based on the first radio frequency signal and a clock circuit configured to generate a clock signal. The radio frequency circuit may be configured to determine a gain adjusted signal based on the second radio frequency signal and on the gain level and the baseband circuit may be configured to synchronize the clock signal based on the gain adjusted signal.

In Example 2, the subject matter of Example 1 can optionally include that the radio frequency circuit may be configured to power-down and to power-up in accordance with a discontinuous reception cycle. The radio frequency circuit may be configured to receive the first radio frequency signal in a first power-up phase of the discontinuous reception cycle and the second radio frequency signal in a second power-up phase of the discontinuous reception cycle.

In Example 3, the subject matter of any one of Examples 1 to 2 can optionally include that the radio frequency circuit may be configured to determine the gain adjusted signal by amplifying the second radio frequency signal with an amplification factor based on the gain level.

In Example 4, the subject matter of any one of Examples 1 to 3 can optionally include that the radio frequency circuit may include a receiver and a gain control circuit. The receiver may be configured to receive the first radio frequency signal and the second radio frequency signal and the gain control circuit may be configured to determine the gain adjusted signal based on the second radio frequency signal and on the determined gain level.

In Example 5, the subject matter of any one of Examples 1 to 4 can optionally include that the gain control circuit may be configured to determine the gain adjusted signal by adjusting at least one of a gain factor to amplify an amplitude of the second radio frequency signal or a gain to amplify a power of the second radio frequency signal.

In Example 6, the subject matter of any one of Examples 1 to 5 can optionally include that the radio frequency circuit may include an antenna configured to receive the first radio frequency signal and the second radio frequency signal.

Example 7 is a communication device that may include a receiver configured to receive a first radio frequency signal and a second radio frequency signal, a clock circuit configured to generate a clock signal, a baseband circuit configured to determine a gain level based on the first radio frequency signal and to synchronize the clock signal based on the second radio frequency signal and the determined gain level and a gain control circuit configured to determine a gain adjusted signal based on the second radio frequency signal and on the determined gain level.

In Example 8, the subject matter of Example 7 can optionally include that the gain control circuit may be configured to determine the gain adjusted signal by amplifying the second radio frequency signal with an amplification factor based on the gain level.

In Example 9, the subject matter of any one of Examples 7 to 8 can optionally include that the receiver may be configured to power-down and to power-up in accordance with a discontinuous reception cycle. The radio frequency circuit may be configured to receive the first radio frequency signal in a first power-up phase of the discontinuous reception cycle. The receiver may be configured to receive the second radio frequency signal in a second power-up phase of the discontinuous reception cycle.

In Example 10, the subject matter of any one of Examples 1 to 9 can optionally include that the baseband circuit may be configured to determine a gain target level that may be lower than the gain level. The gain control circuit may be an automatic gain control circuit configured to amplify the second radio frequency signal in accordance with the gain level as an initial gain level and the gain target level.

In Example 11, the subject matter of Example 10 can optionally include that the gain target level may be an amplitude range. The gain control circuit may be configured to determine the gain adjusted signal to provide the amplitude of the second radio frequency signal being within the amplitude range.

In Example 12, the subject matter of any one of Examples 3 to 11 can optionally include that the baseband circuit may be configured to determine the gain level to be a gain level of the first radio frequency signal.

In Example 13, the subject matter of any one of Examples 1 to 12 can optionally include that the baseband circuit may be configured to determine the gain adjusted signal to generate a gain to amplify the amplitude of the second radio frequency signal that may be constant during the synchronization of the clock signal.

In Example 14, the subject matter of any one of Examples 4 to 13 can optionally include that the receiver may include an antenna configured to receive the first radio frequency signal and the second radio frequency signal.

In Example 15, the subject matter of any one of Examples 1 to 14 can optionally include that the second power-up phase of the discontinuous reception cycle may be different from the first power-up phase of the discontinuous reception cycle.

Example 16 is a method for performing radio communication. The method may include receiving a first radio frequency signal and a second radio frequency signal, determining a gain level based on the first radio frequency signal and generating a clock signal. The method may further include determining a gain adjusted signal based on the second radio frequency signal and on the gain level and synchronizing the clock signal based on the gain adjusted signal.

In Example 17, the subject matter of Example 16 can optionally include that the method may include powering-down and powering-up in accordance with a discontinuous reception cycle and receiving the first radio frequency signal in a first power-up phase of the discontinuous reception cycle and the second radio frequency signal in a second power-up phase of the discontinuous reception cycle.

In Example 18, the subject matter of any one of Examples 16 to 17 can optionally include that the method may include determining the gain adjusted signal by amplifying the second radio frequency signal with an amplification factor based on the gain level.

In Example 19, the subject matter of any one of Examples 16 to 18 can optionally include that the method may include receiving the first radio frequency signal and the second radio frequency signal and determining the gain adjusted signal based on the second radio frequency signal and on the determined gain level.

In Example 20, the subject matter of any one of Examples 16 to 19 can optionally include that the method may include determining the gain adjusted signal by adjusting at least one of a gain to amplify an amplitude of the second radio frequency signal or a gain to amplify a power of the second radio frequency signal.

Example 21 is a method for performing radio communication. The method may include receiving a first radio frequency signal and a second radio frequency signal, generating a clock signal, determining a gain level based on the first radio frequency signal, synchronizing the clock signal based on the second radio frequency signal and the determined gain level and determining a gain adjusted signal based on the second radio frequency signal and on the determined gain level.

In Example 22, the subject matter of Example 21 can optionally include that the method may include determining the gain adjusted signal by amplifying the second radio frequency signal with an amplification factor based on the gain level.

In Example 23, the subject matter of any one of Examples 21 to 22 can optionally include that the method may include powering-down and to power-up in accordance with a discontinuous reception cycle, receiving the first radio frequency signal in a first power-up phase of the discontinuous reception cycle and receiving the second radio frequency signal in a second power-up phase of the discontinuous reception cycle.

In Example 24, the subject matter of any one of Examples 21 to 23 can optionally include that the method may include determining a gain target level that may be lower than the gain level and amplifying the second radio frequency signal in accordance with the gain level as an initial gain level and a gain target level.

In Example 25, the subject matter of Example 24 can optionally include that the gain target level may be an amplitude range and determining the gain adjusted signal to provide the amplitude of the second radio frequency signal being within the amplitude range.

In Example 26, the subject matter of any one of Examples 18 to 25 can optionally include that the method may include determining the gain level to be a gain level of the first radio frequency signal.

In Example 27, the subject matter of any one of Examples 16 to 26 can optionally include that the method may include determining the gain adjusted signal to generate a gain to amplify the amplitude of the second radio frequency signal that may be constant during the synchronization of the clock signal.

In Example 28, the subject matter of any one of Examples 19 to 27 can optionally include that the method may include receiving the first radio frequency signal and the second radio frequency signal.

In Example 29, the subject matter of any one of Examples 16 to 28 can optionally include that the second power-up phase of the discontinuous reception cycle may be different from the first power-up phase of the discontinuous reception cycle.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A communication device, comprising:
   a radio frequency circuit configured to receive a first radio frequency signal and a second radio frequency signal;
   a baseband circuit configured to determine a gain level based on the first radio frequency signal; and
   a clock circuit configured to generate a clock signal,
   wherein the radio frequency circuit is configured to determine a gain adjusted signal based on the second radio frequency signal and on the gain level, and
   wherein the baseband circuit is configured to synchronize the clock signal based on the gain adjusted signal; and
   wherein the gain adjusted signal comprises a gain level of an amplitude of a second radio frequency signal that is constant during the synchronization of the clock signal.

2. The communication device of claim 1,
   wherein the radio frequency circuit is configured to power-down and to power-up in accordance with a discontinuous reception cycle;
   wherein the radio frequency circuit is configured to receive the first radio frequency signal in a first power-up phase of the discontinuous reception cycle and the second radio frequency signal in a second power-up phase of the discontinuous reception cycle.

3. The communication device of claim 2,
   wherein the radio frequency circuit is configured to determine the gain adjusted signal by amplifying the second radio frequency signal with an amplification factor based on the gain level.

4. The communication device of claim 3,
   wherein the radio frequency circuit comprises a receiver and a gain control circuit,
   wherein the receiver is configured to receive the first radio frequency signal and the second radio frequency signal; and
   wherein the gain control circuit is configured to determine the gain adjusted signal based on the second radio frequency signal and on the determined gain level.

5. The communication device of claim 4,
   wherein the gain control circuit is configured to determine the gain adjusted signal by adjusting at least one of a gain factor to amplify an amplitude of the second radio frequency signal or a gain to amplify a power of the second radio frequency signal.

6. A communication device, comprising:
   a receiver configured to receive a first radio frequency signal and a second radio frequency signal;
   a clock circuit configured to generate a clock signal;
   a baseband circuit configured to determine a gain level based on the first radio frequency signal and to synchronize the clock signal based on the second radio frequency signal and the determined gain level; and
   a gain control circuit configured to determine a gain adjusted signal based on the second radio frequency signal and on the determined gain level; and wherein the baseband circuit is configured to determine the gain adjusted signal to generate a gain to amplify an amplitude of the second radio frequency signal that is constant during the synchronization of the clock signal.

7. The communication device of claim 6,
   wherein the gain control circuit is configured to determine the gain adjusted signal by amplifying the second radio frequency signal with an amplification factor based on the gain level.

8. The communication device of claim 7,
   wherein the receiver is configured to power-down and to power-up in accordance with a discontinuous reception cycle;
   wherein the radio frequency circuit is configured to receive the first radio frequency signal in a first power-up phase of the discontinuous reception cycle; and
   wherein the receiver is configured to receive the second radio frequency signal in a second power-up phase of the discontinuous reception cycle.

9. The communication device of claim 1,
   wherein the baseband circuit is configured to determine a gain target level that is lower than the gain level; and
   wherein the gain control circuit is an automatic gain control circuit configured to amplify the second radio frequency signal in accordance with the gain level as an initial gain level and the gain target level.

10. The communication device of claim 9,
    wherein the gain target level is an amplitude range; and
    wherein the gain control circuit is configured to determine the gain adjusted signal to provide the amplitude of the second radio frequency signal being within the amplitude range.

11. The communication device of claim 10,
    wherein the baseband circuit is configured to determine the gain level to be a gain level of the first radio frequency signal.

12. The communication device of claim 11,
    wherein the second power-up phase of the discontinuous reception cycle is different from the first power-up phase of the discontinuous reception cycle.

13. A method for performing radio communication, comprising:
    receiving a first radio frequency signal and a second radio frequency signal;
    determining a gain level based on the first radio frequency signal; and
    generating a clock signal;
    determining a gain adjusted signal based on the second radio frequency signal and on the gain level, and
    synchronizing the clock signal based on the gain adjusted signal; wherein the gain adjusted signal comprises a gain level of an amplitude of a second radio frequency signal that is constant during the synchronization of the clock signal.

14. The method of claim 13,
powering-down and powering-up in accordance with a discontinuous reception cycle; and
receiving the first radio frequency signal in a first power-up phase of the discontinuous reception cycle and the second radio frequency signal in a second power-up phase of the discontinuous reception cycle.

15. The method of claim 14,
determining the gain adjusted signal by amplifying the second radio frequency signal with an amplification factor based on the gain level.

16. The method of claim 15,
receiving the first radio frequency signal and the second radio frequency signal; and
determining the gain adjusted signal based on the second radio frequency signal and on the determined gain level.

17. The method of claim 16,
determining the gain adjusted signal by adjusting at least one of a gain to amplify an amplitude of the second radio frequency signal or a gain to amplify a power of the second radio frequency signal.

18. A method for performing radio communication, comprising:
receiving a first radio frequency signal and a second radio frequency signal;
generating a clock signal;
determining a gain level based on the first radio frequency signal;
synchronizing the clock signal based on the second radio frequency signal and the determined gain level; and
determining a gain adjusted signal based on the second radio frequency signal and on the determined gain level; and wherein the gain adjusted signal generates a gain to amplify an amplitude of the second radio frequency signal that is constant during the synchronization of the clock signal.

19. The method of claim 18,
determining the gain adjusted signal by amplifying the second radio frequency signal with an amplification factor based on the gain level.

20. The method of claim 19,
powering-down and to power-up in accordance with a discontinuous reception cycle;
receiving the first radio frequency signal in a first power-up phase of the discontinuous reception cycle; and
receiving the second radio frequency signal in a second power-up phase of the discontinuous reception cycle.

21. The method of claim 20,
determining a gain target level that is lower than the gain level; and
amplifying the second radio frequency signal in accordance with the gain level as an initial gain level and a gain target level.

22. The method of claim 21,
wherein the gain target level is an amplitude range; and
determining the gain adjusted signal to provide the amplitude of the second radio frequency signal being within the amplitude range.

23. The method of claim 22,
determining the gain level to be a gain level of the first radio frequency signal.

* * * * *